United States Patent [19]

Ravagnani et al.

[11] 4,239,663
[45] Dec. 16, 1980

[54] METHOD, COMPOSITION AND PRODUCT WITH IMPROVED ADHESION BETWEEN A METAL MEMBER AND A CONTIGUOUS RUBBER SKIM STOCK

[75] Inventors: Frederick J. Ravagnani, Uniontown; Steven E. Schonfeld, Akron, both of Ohio

[73] Assignee: The Firestone Tire & Rubber Company, Akron, Ohio

[21] Appl. No.: 965,451

[22] Filed: Nov. 30, 1978

Related U.S. Application Data

[63] Continuation-in-part of Ser. No. 824,767, Aug. 15, 1977, abandoned, which is a continuation-in-part of Ser. No. 824,780, Aug. 15, 1977, abandoned.

[51] Int. Cl.$^3$ .......................... C08L 7/00; C08L 9/00
[52] U.S. Cl. .................................. 260/5; 156/110 A; 260/3; 260/23.7 M; 525/4; 525/6; 525/370; 525/379
[58] Field of Search ................. 260/3, 5, 23.7 M; 526/1, 4, 5; 156/110 A; 525/1, 4, 5, 370, 379

[56] References Cited

U.S. PATENT DOCUMENTS

| | | | |
|---|---|---|---|
| 3,340,214 | 9/1967 | Sapper | 260/23.7 |
| 3,514,370 | 5/1970 | Canevari | 526/4 |
| 3,738,948 | 6/1973 | Dunnom | 260/3 |
| 3,846,160 | 11/1974 | Hirakawa et al. | 156/124 |
| 3,903,026 | 9/1975 | Fujimura et al. | 260/23.7 M |
| 3,936,536 | 2/1976 | Brock | 156/110 A |
| 3,993,847 | 11/1976 | Kondo | 428/451 |
| 4,076,668 | 2/1978 | Kaneda et al. | 526/4 |
| 4,082,909 | 4/1978 | Sugiyama et al. | 526/4 |

OTHER PUBLICATIONS

Kaplan, M. G., et al. "Rubber Mixtures" *Chemical Abstracts* vol. 71, p. 80—125748x (1969).

*Primary Examiner*—Wilbert J. Briggs, Sr.

[57] ABSTRACT

This invention is directed to a method, a rubber skim stock and a product containing the skim stock having improved adhesion between a metal member and contiguous rubber skim stock. The invention lies in the discovery that improved rubber-to-metal adhesion can be obtained by adding to an otherwise conventional rubber skim stock composition appropriate amounts of either p-aminobenzoic acid or a cobalt salt of p-aminobenzoic acid.

The method of this invention comprises the steps of mixing the p-aminobenzoic acid or cobalt salt of p-aminobenzoic acid into a rubber composition, bringing this composition into contiguous relationship with a metal member in an unvulcanized product and vulcanizing the product to yield the end product.

12 Claims, No Drawings

METHOD, COMPOSITION AND PRODUCT WITH IMPROVED ADHESION BETWEEN A METAL MEMBER AND A CONTIGUOUS RUBBER SKIM STOCK

RELATED APPLICATIONS

This application is a continuation-in-part composite of our copending applications, U.S. Ser. No. 824,767 and U.S. Ser. No. 824,780, both filed on Aug. 15, 1977 now abandoned.

BACKGROUND OF THE INVENTION AND PRIOR ART

In the production of rubber articles such as hose, pneumatic tires or power transmission belts such as V-belts, toothed positive drive belts, etc., it is generally necessary to reinforce the rubber or elastomeric product. In the past, textile materials have been employed for this purpose. However, wire cord has been found to be more desirable under certain conditions of use, for example, in pneumatic tires of the radial ply type. Maximum reinforcement of the rubber is obtained when maximum adhesion is produced and retained between the laminate of a contiguous rubber skim stock and the metal reinforcing element as used to form a unitary structure. Of equal importance is the requirement that, for example, the laminate of the reinforcing metal element and contiguous rubber remain in a bonded relationship with each other throughout the useful life of the reinforced structure in which the laminate is used.

To achieve satisfactory rubber-to-metal bonding, numerous methods have been developed. For example, U.S. Pat. No. 2,720,479 describes a system wherein a phenolic resin and a brominated isoolefin-polyolefin interpolymer are dissolved in a suitable liquid carrier and the resulting adhesive composition is spread on rubber which is to be bonded to metal. The rubber and metal are subsequently pressed together and vulcanized. U.S. Pat. No. 2,581,920 also describes the use of halogenated polymers to bond rubber to metal.

In U.S. Pat. No. 3,517,722 to Endter et al., a rubber-metal adhesion system is described which involves formation of a resorcinol-formaldehyde resin at the interface between the rubber and the metal, thereby bonding these members together. In forming the resin, compounds capable of liberating the methylene precursor are added to resorcinol in the rubber stock. Upon vulcanization, the methylene and resorcinol react to form the resorcinol-formaldehyde resin.

According to U.S. Pat. No. 3,846,160, the adhesion force between steel cord and rubber is enhanced by applying a mineral oil solution containing, for example, an organic acid salt of a higher aliphatic amine to zinc plated or brass plated steel cord.

The adhesion of rubber to metal such as wire tire cord is improved according to U.S. Pat. No. 3,847,727 by incorporating a halogenated quinone and the condensation product of resorcinol and acetaldehyde into the rubber prior to application to the metal and vulcanization of the composite.

The disclosure of U.S. Pat. No. 3,903,026 teaches the preparation of a rubber composition having improved metal adhesion properties even after thermal aging; this is disclosed to be achieved by compounding cobalt carboxylate and magnesium oxide (0.1 to 4 phr) into rubber.

U.S. Pat. No. 3,738,948 is directed to a fiber reinforced rubber composition that can be utilized in tire construction. The fiber can be glass, nylon, rayon or metal wire. The composition is disclosed to contain a finely divided silica, hexamethylene tetramine, resorcinol and a compatible metal soap such as calcium stearate. Similar compositions containing discontinuous fiber filaments are disclosed in U.S. Pat. No. 3,746,669.

U.S. Pat. No. 3,340,214 teaches the use of benzoic acid or nitrobenzoic acid as an additive to reduce the resiliency of rubber as utilized, for example, in the production of tires.

DESCRIPTION OF THE INVENTION

This invention relates to a method, a rubber skim stock and a product containing the skim stock wherein the invention yields improved adhesion between a contiguous rubber skim stock and a metal member. The invention lies in the discovery that improved rubber-to-metal adhesion can be obtained by adding to an otherwise conventional rubber skim stock composition appropriate amounts of either p-aminobenzoic acid (PABA) or a cobalt salt of p-aminobenzoic acid.

The method to this invention comprises the steps of mixing the PABA or a cobalt salt of PABA into a rubber composition, as described below, bringing this composition into contiguous relationship with at least one metal member in an unvulcanized product and vulcanizing the product to yield the end product.

The para-aminobenzoic acid used to illustrate the present invention was purchased from Aldrich Chemical Company, Inc. and was specified as having a molecular weight of 137.14, a melting range of 188° to 189° C., and a density at its melting point of 1.374. It was classified as being 99% pure.

Cobalt p-aminobenzoic acid was prepared by adding p-aminobenzoic acid (137 g, 1 mole) to a solution of sodium hydroxide (40 g, 1 mole) in 900 ml. of distilled water at room temperature with mechanical stirring. To the resulting brown solution of the sodium salt of p-aminobenzoic acid was added slowly a solution of cobaltous chloride (120 g, 0.506 mole) in 100 ml. of distilled water at room temperature with stirring. A reaction took place immediately to form a pink precipitate. After the addition was complete, the reaction mixture was stirred at room temperature for an additional 3 hours. The solid was collected on a filter, washed with a small amount of water and dried at 120° C. under vacuum overnight. After this drying step, dark purple solid cobalt p-aminobenzoic acid was obtained in 81% yield (135 g).

The rubber compound is described with all ingredients based on the total rubber component in the compound being 100 parts by weight.

The composition of this invention consists essentially of 100 parts rubber, 40 to 70 phr carbon black, 4 to 10 phr zinc oxide, 10 to 30 phr silica, 0.5 to 1 phr antioxidant, 0.5 to 1 phr stearic acid, 0.2 to 2.0 phr accelerator, 1 to 10 phr hydrocarbon resin, 2 to 6 phr resorcinol, 1 to 5 phr Manobond C, 4 to 9 phr sulfur/oil, 80/20, 4 to 9 phr melamine resin and 0.5 to 8 phr of PABA or 2–8 phr of a cobalt salt of PABA.

DETAILED DESCRIPTION OF THE INVENTION

The following Examples are representative of the method and rubber composition of this invention. The composition component parts are expressed in parts per hundred rubber, phr, unless otherwise specified. These components are broadly within the ranges set out below:

| Masterbatch | |
|---|---|
| Natural rubber | 60–80 parts |
| Butadiene | 40–20 parts |
| Carbon black | 40–70 phr |
| Zinc oxide | 4–10 phr |
| Silica | 10–30 phr |
| Stearic acid | .5–1 phr |
| Antiozonant/antioxidant (i.e., Santoflex 13) | .5–1 phr |
| Hydrocarbon resin | 1–10 phr |
| Resorcinol | 2–6 phr |
| Manobond C | 1–5 phr |

| Final Mix | |
|---|---|
| Accelerator | .2–2 phr |
| Sulfur/oil 80/20 | 4–9 phr |
| Melamine resin (i.e., Cyrez 963) | 4–9 phr |
| PABA or transition metal salt of PABA or | 0.5–8 phr |
| Cobalt PABA (when present) | 2.0–8 phr |

Specific detailed examples of useful compositions within the ranges set out above are:

EXAMPLE I

The following composition was Banbury mixed at about 280°–340° F. for seven (7) minutes, or 340° F., whichever occurs first, and a rotor speed of 80 rpm; the resulting masterbatch was then dumped. The Banbury type was a Type B Internal Mixer (Farrel-Birmingham Company).

| | | Parts |
|---|---|---|
| (1) | natural rubber | 75 parts |
| (2) | butadiene rubber | 25 parts |
| (3) | carbon black (FEF) | 40 phr |
| (4) | zinc oxide | 4.0 phr |
| (5) | pelletized hydrated silica | 10 phr |
| (6) | stearic acid | 1.0 phr |
| (7) | N-(1,3-dimethyl butyl)-N'-phenyl-p-phenylenediamine | 1.0 phr |
| (8) | hydrocarbon resin | 5.0 phr |
| (9) | resorcinol (meta-dihydroxybenzene) | 2.5 phr |
| (10) | Manobond C 16 | 3.5 phr |

The hydrocarbon resin was in flake form, had a softening point between about 100° to 110° C., an iodine number of from 125 to 167, and an ash content of 0.05%. The masterbatch resulting from the preceding was then final roll mill mixed for 4 to 8 minutes until dispersion was achieved at a mill speed of approximately 50 rpm and at a temperature of from 160° to 180° F.; the resulting final mix was then dumped. The composition components added to the masterbatch prior to final mill mixing were as follows:

| (a) | N-tert-butyl-2-benzothiazole sulfenamide | 0.7 phr |
|---|---|---|
| (b) | sulfur oil, 80/20 | 6.0 phr |
| (c) | hexamethoxymethyl-melamine powder, and | 4.0 phr |
| (d) | PABA. | 1.5 phr |

This product was cured for 30 minutes at 300° F., a cure pressure of 800–900 psi, and is the invention composition of Table I. The control is the identical composition without para-aminobenzoic acid.

Table I which follows illustrates the performance of our PABA containing composition with bright steel (unplated) wire as it would be utilized.

TABLE I

| Test | Control | Invention Composition |
|---|---|---|
| R.T. Ring Tensile-30' Cure/300° F. | | |
| 300% Modulus, (psi) | 1560 | 1830 |
| Tensile Strength, (psi) | 2340 | 2410 |
| Elongation, (%) | 400 | 410 |
| Unconditioned T Adhesion to (Bright steel)* | | |
| 30' Cure, R.T. Test | 88 (20) | 139 (100) |
| 45' Cure, R.T. Test | 89 (20) | 137 (100) |
| +' Cure, 230° F. Test | 71 (30) | 118 (90) |
| 45' Cure, 230° F. Test | 68 (30) | 124 (90) |
| Conditioned T Adhesion to bright steel after 1 hour in 300° F. steam | | |
| 30' Cure at 300° F. Tested at 230° F. | 61 (10) | 118 (90) |

(T adhesion values in lb./in.; Coverages in (%))
*Bright steel-unplated

EXAMPLE 2

Substantially the same results of Table I are achieved when the following masterbatch and composition added prior to final mill mixing are substituted therein:

| Masterbatch | | |
|---|---|---|
| (1) | Natural rubber | 75 parts |
| (2) | Polybutadiene rubber | 25 parts |
| (3) | Carbon black (FEF) | 55 phr |
| (4) | Zinc oxide | 10 phr |
| (5) | Pelletized hydrated silica | 12.5 phr |
| (6) | Stearic acid | 1 phr |
| (7) | N-(1,3-dimethyl butyl)-N'-phenyl-p-phenylenediamine | 1 phr |
| (8) | Hydrocarbon resin | 5 phr |
| (9) | Resorcinol (meta-dihydroxybenzene) | 4 phr |
| (10) | Manobond C 16 | 3.5 phr |

| Composition Added to Above Masterbatch | | |
|---|---|---|
| (A) | Sulfur/oil - 80/20 powder | 7 phr |
| (B) | Hexamethoxymethyl-melamine | 6 phr |
| (C) | N-tert-butyl-2-benzothiazole-sulfenamide | 0.7 phr |
| (D) | PABA | 1.5 phr |

EXAMPLE 3

A masterbatch identical to that described in Example I was mixed. This masterbatch was mixed into a final mix by the procedure described in Example I wherein the following components were added in the final mix:

| (a) | N-tert-butyl-2-benzothiazole-sulfenamide | 0.35 phr |
|---|---|---|
| (b) | sulfur oil, 80/20 | 6.0 phr |
| (c) | hexamethoxymethyl-melamine powder, and | 4.0 phr |

| -continued | | |
|---|---|---|
| (d) cobalt PABA (Co-PABA) | 4.0 | phr |

This product was cured for 30 minutes at 300° F., a cure pressure of 800–900 psi, and is the invention composition of Table II. The control is the identical composition without cobalt p-amino-benzoic acid.

Table II which follows illustrates the performance of our Co-PABA containing composition with bright steel (unplated) wire as it would be utilized.

TABLE II

| Test | Control | Invention Composition |
|---|---|---|
| R.T. Ring Tensile - 30' Cure/300° F. | | |
| 300% Modulus, (psi) | 1560 | 1620 |
| Tensile Strength, (psi) | 2340 | 2090 |
| Elongation, (%) | 400 | 880 |
| Unconditioned T Adhesion to (bright steel)* | | |
| 30' Cure, R.T. Test | 88 (20) | 135 (80) |
| 45' Cure, R.T. Test | 89 (20) | 140 (80) |
| 30' Cure, 230° F. Test | 71 (30) | 107 (80) |
| 45' Cure, 230° F. Test | 68 (30) | 102 (80) |
| Conditioned T Adhesion to bright steel after 1 hour in 300° F. Steam | | |
| 30' Cure at 300° F. Tested at 230° F. | 61 (10) | 108 (90) |

(T adhesion values in lb./in.; Coverages in (%) )
*Bright steel-unplated

EXAMPLE 4

Substantially the same results of Table II are achieved when the following masterbatch and composition added prior to final mill mixing are substituted therein:

| Masterbatch | | |
|---|---|---|
| (1) Natural rubber | 75 | parts |
| (2) Butadiene rubber | 25 | parts |
| (3) Carbon black (FEF) | 55 | phr |
| (4) Zinc oxide | 10 | phr |
| (5) Pelletized hydrated silica | 12.5 | phr |
| (6) Stearic acid | 1 | phr |
| (7) N-(1,3-dimethylbutyl)-N'-phenyl-p-phenylenediamine | 1 | phr |
| (8) Hydrocarbon resin | 5 | phr |
| (9) Resorcinol (meta-dihydroxybenzene) | 4 | phr |
| (10) Manobond C 16 | 3.5 | phr |

| Composition added to above Masterbatch | | |
|---|---|---|
| (A) Sulfur/oil - 80/20 powder | 7 | phr |
| (B) hexamethoxylmethyl-melamine | 6 | phr |
| (C) N-oxydiethylene benzothiazole-2-sulfenamide, and | .8 | phr |
| (D) Cobalt PABA | 4 | phr |

The steel cord adhesion results set forth for bright steel wire (unplated) in the Examples above were determined by the following T adhesion procedure:

T-ADHESION TEST

1. Using a clicker machine and a 6×½ inch die, prepare an adequate number of experimental and control stock samples for pad building.
2. Use one piece of calendered fabric backing (0.051").
3. Ply one piece of control rubber stock (0.060") onto the fabric backing.
4. Place sample in building jig with fabric side down.
5. Place ten cords (of wire) approximately 7" in length equally spaced on top of the two piece assembly.
6. Invert another 2 ply assembly, made as in items 1, 2 and 3 on top of cords so that cords are between 2 layers of stock to be tested.
7. This assembly should now fit snugly into the mold.
8. Adhesion pads shall be cured for 30 minutes at 300° F., and then allowed to equilibrate for 24 hours.
9. Testing Machine: 1130 Instron Universal Tester.
10. Test speed 10"/minute; temperature 230° F. after a 20' preheat.
11. The top grip shall be of a special holder made for the cured sample, with a slot in the bottom to permit the sample to be inserted with the wire protruding. The bottom grip shall be a wedge type, designed to exert increasing tightening as the wire is pulled.
12. Record 10 pulls and average. Multiply by 2 to get lbs. adhesion per imbedded inch of wire.

Characteristics of several of the ingredients set out in the examples are set out below. These definitions are to be considered by way of illustration and represent known materials that have proven useful in this invention.

Preferably, the skim stock also contains a suitable proportion of a conventional organo-cobalt complex, such as a material which is commercially sold under the name "Manobond C". It is known that such materials, including Manobond C, facilitate rubber-to-metal adhesion.

Manobond C is a commercially available source of a cobalt and boron containing additive that is compatible in our formulation; it is believed to have the structure:

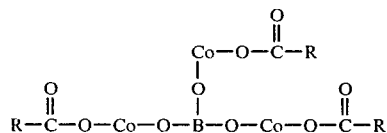

wherein each "R" is an alkyl radical of from 9 to 12 carbons. Manobond C is available as a blue, viscous liquid; it contains 15.5 to 16.5% cobalt (Manobond C 16) or it contains 17.5 to 18.5% cobalt (Manobond C 18); it has a viscosity (at 25° C.) of 3,000 to 9,000 cps. The ash content is from 22 to 25 weight percent. Manobond C is commercially available from Wyrough and Loser, Inc., Trenton, N.J.

The rubber to be used in the practice of this invention includes vulcanizable rubbers. Rubbers that can be utilized include natural rubbers, synthetic rubbers, polyisoprene, polybutadiene, copolymers of butadiene and styrene and the like, and blends thereof. The particular rubber composition selected is preferably a blend of natural rubber and polybutadiene. An extender oil, when utilized, can be, for example, any known medium process oil, aromatic or naphthenic hydrocarbon derived.

The antioxidant selected can be, for example, N-(1,3-dimethyl butyl)-N'-phenyl-p-phenylenediamine, known in the trade as Santoflex 13; or other phenyl-p-phenylenediamine derivatives.

The accelerator preferably utilized in the practice of our invention is N-oxydiethylene benzothiazole-2-sulfenamide; this accelerator is commercially available from American Cyanamid and is known as NOBS Special. Other accelerators such as N-t-butyl-2-benzothiazole-sulfenamide can also be utilized; the particular accelerator selected is not critical.

Any known rubber reinforcing carbon black can be used, such as the known FEF, ISAF and other carbon blacks. Curing is preferably achieved through use of sulfur as a sulfur/oil blend preferably utilized at a ratio of 80/20. The use of FEF carbon black is preferred.

The pelletized hydrated silica is commercially available, for example, from PPG, Industries, Inc., Pittsburgh, Pa. The preferred silica is identified as Hi-Sil 233.

Commercially available hydrocarbon resins that can be utilized in the invention include, for example, Butaprene 105 (Reichhold Chemical) and Picco 14215 supplied by Hercules, Inc. Included are the intermediate and aliphatic hydrocarbon resins that are otherwise commercially available. The selected hydrocarbon resin will preferably have a softening point of from about 100° to about 110° C., an iodine number of from about 125 to about 167 and a maximum ash content of 0.05%.

The melamine resin is preferably Cyrez 963, one of a family of melamine resins marketed by American Cyanamid.

The preceding Examples can be varied within the scope of our total specification disclosure, as it would be understood and practiced by one skilled in the art, to achieve essentially the same results. Equivalent reactants can be used within the designated ranges specified.

Compounding ingredients customarily employed in the rubber compounding art can be added to our skim stock composition and include accelerators, antioxidants, bactericides and the like, color pigments, extenders, reinforcing pigments, softeners, vulcanizing agents, etc. The compounding ingredients are used in the amounts necessary to achieve the desired properties in the resulting vulcanizate as is well known to those skilled in the art.

The skim stock of the present invention can be applied by use of calendering means, spray means or other known application techniques. Areas of significant utility include, but are not limited to, radiator hose, pneumatic tires, air ride springs, metal reinforced products such as rubber bumpers and sporting goods grips such as golf club handles; in each of these representative areas of utility, the skim stock composition can be used to increase adhesion and adhesion retention properties between metal and rubber, including use in operation when bright steel surfaces are present.

When the skim stock of this invention is used in steel cord tire construction, for example, it is extremely important, both in new tire construction and retread or repair operations, that the bond between the rubber ply stock and the wire fabric be as flexible and as strong as possible for efficient use under operation conditions; this is especially important in the case of truck tires which are subjected to high loads and speeds with consequent heat buildup due to the rapid flexing of the plies.

The present invention also finds utility in, for example, metal-rubber articles such as motor mounts, cutless bearings, torsilastic springs, power belts, printing rolls, metal wire reinforced or braided hose, electrical deicers, shoe heels, and wherever it is desired to secure rubber to plated or unplated metal to provide a flexible and strong bond between the same.

Acceptable results would be achieved on substituting brass or zinc plated steel wire for the bright steel wire of Tables I and II. The wire coated in the practice of our invention can be, for example, brass plated wire, i.e., 70% Cu, 30% Zn, zinc plated, or, bright (unplated) steel. The wire can be in the form of a strand, mat, web, ply or braid.

We claim:

1. In a cured rubber skim stock of conventional composition, said stock being bonded to at least one metal member contained within said stock, the improvement wherein a minor proportion of para-aminobenzoic acid or a cobalt salt of para-aminobenzoic acid is incorporated into said stock prior to curing.

2. The composition of claim 1 having 0.5 to 8.0 phr of para-aminobenzoic acid.

3. The composition of claim 1 having 2.0 to 8.0 phr of a cobalt salt of para-aminobenzoic acid.

4. A composition according to claim 1 wherein said curing is achieved by vulcanization.

5. In a method for improving the adhesion of a cured rubber skim stock of conventional composition to at least one metal member contained within said stock, the improvement wherein a minor proportion of para-aminobenzoic acid or a cobalt salt of para-aminobenzoic acid is incorporated into said stock prior to curing.

6. The method of claim 5 wherein from 0.5 to 8.0 phr of para-aminobenzoic acid is incorporated into said stock prior to curing.

7. The method of claim 5 wherein from 2.0 to 8.0 phr of a cobalt salt of para-aminobenzoic acid is incorporated into said stock prior to curing.

8. The method of claim 4 wherein said curing is achieved by vulcanization.

9. A tire having improved adhesion between a cured rubber skim stock of conventional composition, and, metal reinforcing members imbedded therein, the improvement wherein a minor proportion of para-aminobenzoic acid or a cobalt salt of para-aminobenzoic acid has been incorporated into said stock prior to curing.

10. A tire according to claim 9 wherein said curing is achieved by vulcanization.

11. The tire of claim 9 wherein said composition contains from 0.5 to 8.0 phr of para-aminobenzoic acid.

12. The tire of claim 9 wherein said composition contains 2.0 to 8.0 phr of a cobalt salt of para-aminobenzoic acid.

* * * * *

UNITED STATES PATENT AND TRADEMARK OFFICE
CERTIFICATE OF CORRECTION

PATENT NO. : 4,239,663
DATED : December 16, 1980
INVENTOR(S) : FREDERICK J. RAVAGNANI and STEVEN E. SCHONFELD It is certified that error appears in the above-identified patent and that said Letters Patent are hereby corrected as shown below:

Column 4, TABLE I

"+' Cure" should read -- 30' Cure --

Column 5, TABLE II

Elongation, (%) under Invention Composition

"880" should read -- 380 --

Column 5, EXAMPLE 4

Composition added to above Masterbatch (B) -- 6 phr -- should be typed directly under 7 phr Signed and Sealed this Twenty-sixth Day of May 1981

[SEAL]

Attest:

RENE D. TEGTMEYER

Attesting Officer — Acting Commissioner of Patents and Trademarks